July 18, 1933. F. S. KINKEAD Re. 18,900

TELEGRAPH REPEATING SYSTEM

Original Filed July 14, 1928

INVENTOR
F. S. KINKEAD
BY J. W. Schmied
ATTORNEY

Reissued July 18, 1933 Re. 18,900

UNITED STATES PATENT OFFICE

FULLERTON S. KINKEAD, OF BROOKLYN, NEW YORK, ASSIGNOR TO BELL TELEPHONE LABORATORIES, INCORPORATED, OF NEW YORK, N. Y., A CORPORATION OF NEW YORK

TELEGRAPH REPEATING SYSTEM

Original No. 1,752,436, dated April 1, 1930, Serial No. 292,701, filed July 14, 1928. Application for reissue filed July 16, 1931. Serial No. 551,269.

This invention relates to telegraph systems and particularly to repeaters for repeating telegraph signals from one closed, non-polar telegraph circuit to another.

An object of the invention is to reduce the installation and maintenance expense of a telegraph repeating system by reducing the number of sources of power required.

A feature of the invention is a repeater system adapted to repeat signals from either of two connected line sections into the other, and utilizing polar relays operated from a single grounded battery of either polarity.

It was long the practice in designing repeaters for single line telegraph systems to utilize neutral or non-polarized relays or combinations of such relays with other non-polarized instruments. Non-polarized relays are less efficient than polarized relays, being more sluggish in their action and requiring more current to operate, and, accordingly, repeaters utilizing polar relays were developed and adopted. A repeating system of the latter type is disclosed in patent to J. M. Fell 1,479,430 January 1, 1914. Such systems operate satisfactorily but require for their operation two sources of current of opposite polarities with respect to ground. In practice this is usually supplied from two batteries connected in series with the mid-connection grounded.

In accordance with this invention a repeater circuit is provided which utilizes polar relays but requires for its operation only a single grounded source of current of either positive or negative polarity. The effect of a second source of current of opposite polarity is produced by means of potentiometer arrangements of resistances.

Figure 1:
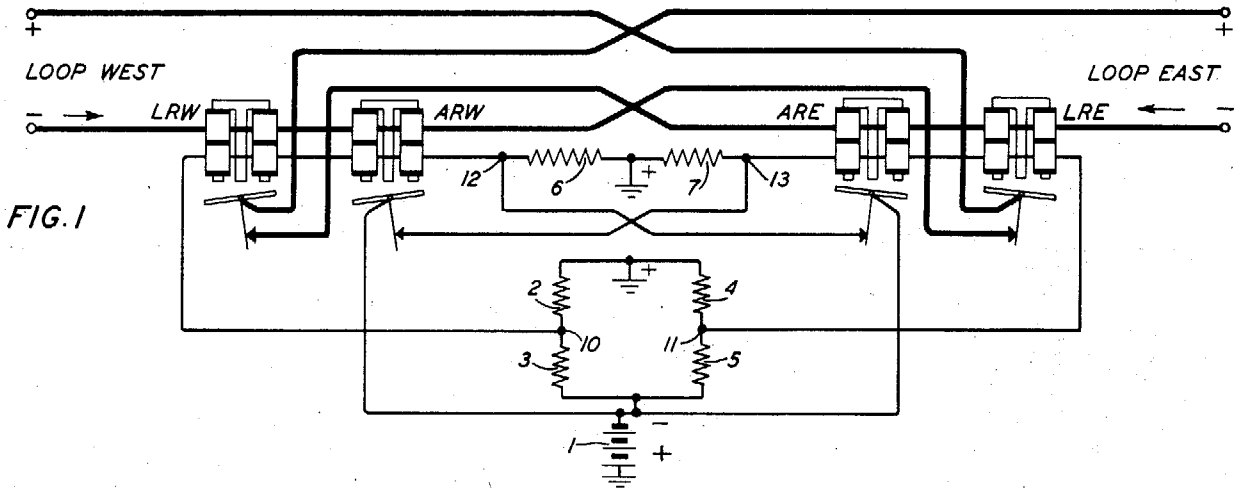
Figure 2:
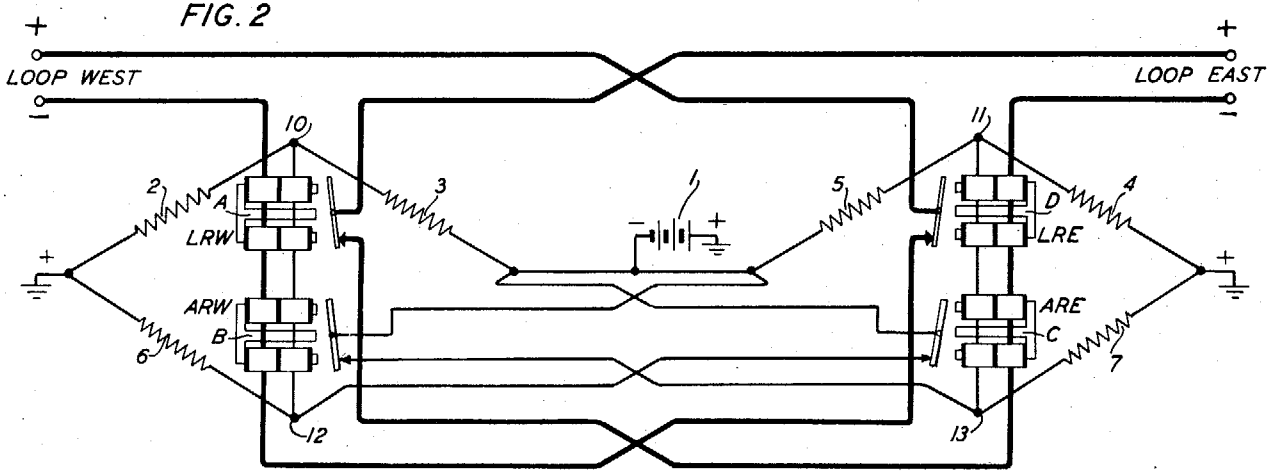

Fig. 1 if the drawing contains a diagram showing a simplified circuit of a repeater in accordance with this invention, and Fig. 2 shows the same circuit diagram drawn in a manner to show that the circuit embodies a double Wheatstone bridge arrangement, wherein a relay connected across the bridge points of each bridge controls a leg of the other bridge.

The following description applies equally well to each figure:—

The repeater comprises, referring to the drawing, four polar relays properly associated with a single source of grounded potential 1, and resistors 2 to 7.

The relays are arranged in pairs, one pair comprising a line relay west LRW, and an auxiliary relay west ARW, having their upper, or line, windings connected in series with the loop west circuit; and the other pair comprising a line relay east LRE, and an auxiliary relay east ARE, having their upper windings connected in series with the loop east circuit. The loop west circuit also includes the contacts of the opposite line relay LRE and the loop east circuit includes the contacts of the opposite line relay LRW.

For purposes of explanation let it be assumed that an electron flow through any winding of any relay, as they are shown in the drawing, tends to urge the relay tongue to make contact upon the side toward which the electron flow is proceeding. For instance, when no signals are being repeated the loop west is closed through a source of current, at the distant station, of such polarity as to cause an electron flow from left to right through the upper windings of relays LRW and ARW and hold the tongues of those relays against their contacts. At the same time the loop east is closed through a source of current, at the eastern station, of such polarity as to cause an electron flow from right to left through the upper windings of relays LRE and ARE and hold the tongues of those relays against their contacts.

When no signals are being repeated, the relay tongues are in the positions shown in the drawing, and a local circuit is completed from the negative terminal of the battery 1, through the contacts on relay ARE and resistor 6 to the positive terminal of the battery. Resistor 6 has an impedance large as compared with that of the path from the negative terminal of the battery through the relay contacts and, therefore, point 12 is at substantially the potential of the negative terminal of battery 1. Now there is a path in parallel to the one just outlined through resistors 3 and 2. These resistors have substantially equal impedances, and therefore the voltage across each is about half the voltage of battery 1. Hence point 10 is positive with respect to point 12 and there is a resultant electron flow from right to left through the lower or biasing windings of relays LRW and ARW. This biasing current tends to move the relay tongues to the left, but its effect is overcome by the stronger line current flowing in the opposite direction through the upper windings of the relay.

There is also a flow of current through the contacts of relay ARW and resistor 7 which maintains point 13 negative with respect to point 11 and causes an electron flow from left to right through the biasing windings of relays ARE and LRE. This current, however, is weaker than the line current flowing in the opposite direction through the upper windings, and the relay tongues are held against their contacts by the stronger line current.

When telegraph signals are transmitted from loop west to loop east, the loop west is opened, breaking the normal flow of line current through the upper windings of relays LRW and ARW. These relays thereupon move their tongues to the left in response to the biasing current in their lower windings. Relay LRW repeats the open signal to the loop east by opening the latter circuit at the relay contacts.

This opening of the loop east at the contacts of relay LRW breaks the normal flow of line current through the line windings of relays ARE and LRE, but the tongues of those relays remain against their contacts because the direction of the normal biasing current through their lower windings was reversed when relay ARW operated and opened the circuit from the negative terminal of battery 1 to point 13. Thus, with the contacts of relay ARW open, resistor 7 and the lower windings of relays ARE and LRE are connected in series across resistor 4. Hence electrons flow from the negative terminal of battery 1 through resistor 5, from right to left through the lower windings of relays ARE and LRE, through resistor 7, to the positive terminal of battery 1.

When the loop west is open in the course of sending an open impulse from west to east the contact of relay ARW is open. While this open condition persists, opening of the loop east cannot reverse the position of the armature of relay LRE because opening of the contacts of relay ARW conditions the bridge circuit in which the relay LRE has its winding to hold the relay LRE with its contact closed. Since signal impulses consist of open conditions transmitted from one line to the other this arrangement prevents reflection of signal impulses transmitted from one line back into that line.

When the loop west is again closed, the normal line current overcomes the biasing current in the windings of relays LRW and ARW and moves the tongues of those relays to the right, restoring the circuit to its original condition and repeating a closed impulse into the loop east.

When signals are transmitted from east to west the operation of the repeater is the converse of that outlined, relay LRE operating to open the loop west, and relay ARE operating to reverse the direction of the biasing current in relays LRW and ARW so that they will not operate when their line windings are opened at relay LRE.

Should the operator at one line terminal transmit a break signal while the operator at the distant terminal is transmitting, the break signal will be transmitted through the repeater in the following manner.

Assume that signals are being transmitted from loop west to loop east and the operator at the eastern station breaks the loop east. If an open signal is being trasmitted from loop west at that instant there will be no change in the positions of the relays at the repeater, but as soon thereafter as loop west is closed, the tongues of relays LRW and ARW move to the position shown in the drawing. This closes the normal biasing circuit through the contacts of relay ARW and the lower windings of relays ARE and LRE, moving the tongues of those relays away from their contacts and opening the loop west. The loop west thereupon remains open as long as the loop east is open, thus transmitting the break signal to the west operator.

The operation of the repeater in transmitting a break signal from west to east is the converse of that outlined above.

The biasing current in the lower windings of the relays may be varied by changing the relative impedances of the resistors 2, 3, 4 and 5 with respect to resistors 6 and 7. Ordinarily it is desirable to have the biasing current about half as strong as the line current.

What is claimed is:

1. A telegraph repeater for repeating between two closed, non-polar telegraph circuits each containing a source of current, comprising a first and a second polar relay means, each having a first and a second independent actuating winding and a first and a second pair of contacts, the first winding of said first means being connected through the first set of contacts on said second means to one line section and the first windings of said second means being connected through the first set of contacts on said first means to the other line section, means comprising a single source of electromotive force of constant polarity, a first resistor, and the second pair of contacts on one of said relay means, for supplying a current to the second winding on the other relay means opposite in effect to the normal line current in the first winding of said other relay means, and means comprising said source of electromotive force, a second and a third resistor for suplying a current to the second winding in the same sense as the normal line current, independently of the second pair of contacts on the other relay.

2. A telegraph repeating system comprising two line sections, a pair of relays connected with each section, each relay having an armature and two windings, each of said windings being serially connected to a corresponding winding of the other one of the same pair, a line circuit for each section normally closed through one winding of each relay of one pair and contacts of a relay of the other pair, two local circuits one for the other windings of each pair, a single source of electromotive force and resistance elements, one of said local circuits extending from one terminal of said source through one of said resistance elements, said other windings of one pair, and a second resistance, to the other terminal of said source, and the other local circuit extending from said one terminal through the contacts of the other relay of said other pair of relays through said other windings in opposite sense to said first local circuit, through a third resistance, to the other terminal of said source.

3. A telegraph repeater system comprising two line sections, relay means for each section, each relay means having a line winding, an auxiliary winding and a set of contacts, the line winding of each relay means being connected to the corresponding line section through the set of contacts on the other relay means, instrumentalities for supplying a current in one direction through the auxiliary winding of one relay means, said instrumentalities comprising a source of electromotive force, a potentiometer bridged across said source, one auxiliary winding terminal being connected to an intermediate point on said potentiometer, the other winding terminal being connected through a resistance to one terminal of the source, and means for reversing the flow of the auxiliary winding current comprising a second set of contacts on the other relay means for connecting the other auxiliary winding terminal directly or through a lower resistance to the other terminal of the source.

4. In a telegraph repeater system, a first line section, a second line section, a first and second Wheatstone bridge interposed between said line sections, means controlled by the first bridge for repeating impulses from one of said line sections into the other line section, means controlled by the second bridge for repeating impulses from the other of said line sections into the first line section, and means controlled by said bridges for preventing the reflection of signals received over said line sections back therein.

5. In a telegraph repeater, a first line section, a second line section, a first and second Wheatstone bridge, and means whereby each of said bridges controls a leg of the other of said bridges.

6. In a telegraph repeater, a first line section, a second line section, a Wheatstone bridge for each of said line sections, and relay means in each of said line sections adapted to control the leg of its associated bridge.

7. In a telegraph repeater, a first line section, a second line section, a Wheatstone bridge for each of said line sections, each of said bridges including a relay for controlling a leg of the other of said bridges.

8. In a telegraph repeater, a first line section, a second line section, a Wheatstone bridge for each of said line sections, a relay connected between the bridge points of each bridge, the relay of each bridge controlling a leg of the other bridge.

9. In a telegraph repeater, a first line section, a second line section, a first Wheatstone bridge associated with said first line section, a second Wheatstone bridge associated with said second line section, a relay connected between the bridge points of said first bridge, said relay controlling a leg of said second bridge, means responsive to impulses transmitted over said first line section for controlling said relay, a relay connected between the bridge points of said second bridge, said last-mentioned relay controlling a leg of said first bridge, and means responsive to impulses transmitted over said second line section for controlling said last-mentioned relay.

10. In a telegraph system, a first line section, a second line section, a first Wheatstone bridge associated with said first line section, a second Wheatstone bridge associated with said second line section, a relay connected between the bridge points of said first bridge, said relay controlling said second line section, means responsive to impulses transmitted over said first line section for controlling said relay, a relay connected between the bridge points of said second bridge, said last-mentioned relay controlling said first line section, and means responsive to impulses transmitted over said second line section for controlling said last-mentioned relay.

11. In a telegraph repeater, a first line section, a second line section, a first Wheatstone bridge associated with said first line section, a second Wheatstone bridge associated with said second line section, a pair of relays connected between the bridge points of said first bridge, one of said relays controlling the second line section, the other of said relays controlling a leg of the second bridge, means responsive to impulses transmitted over said first line section for controlling said relays, a pair of relays connected between the bridge points of said second bridge, one of said last-mentioned relays controlling the first line section, the other of said last-mentioned relays controlling one leg of said first bridge, and means responsive to impulses transmitted over said second line section for controlling said last-mentioned relays.

12. In a telegraph repeater, a first line section, a second line section, a first Wheatstone bridge associated with said first line section, a second Wheatstone bridge associated with said second line section, a pair of relays connected between the bridge points of said first bridge, said relays being connected in series with each other, one of said relays controlling the second line section, the other of said relays controlling one leg of said second bridge, means responsive to impulses transmitted over said first line section for controlling said relays, a pair of relays connected between the bridge points of said second bridge, said last-mentioned relays being connected in series with each other, one of said last-mentioned relays controlling the first line section, the other of said last-mentioned relays controlling one leg of said first bridge, and means responsive to impulses transmitted over said second line section for controlling said last-mentioned relays.

13. In a telegraph repeater, two Wheatstone bridges, each of said bridges comprising three legs of equal resistance and one leg of lower resistance, means for controlling the low resistance leg of each bridge whereby the difference of potential between the bridge points thereof is varied, an electromagnetic means connected across the bridge points of each bridge, the electromagnetic means of the first bridge controlling the low resistance leg of the second bridge, and the electromagnetic means of the second bridge controlling the low resistance leg of the first bridge.

14. An electric circuit network comprising a polarized relay, a single two-terminal source of electromotive force connected to cause current to flow through the winding of said relay, a single make and break contact connected to said source of electromotive force and to said relay, and a plurality of resistances connected to said relay, source and contact, and a path from said source through said contact when closed whereby operation of said make and break contact causes reversal of current from said source through said relay.

15. In a telegraph repeater, two polar receiving relays, biasing circuits for each relay comprising each an unbalanced Wheatstone bridge circuit, each receiving relay operative to reverse the balance of the bridge circuit of the other relay, each relay being inoperative when its own bridge circuit is reversed in balance.

16. In a telegraph system, a first line circuit, a second line circuit, polar receiving relays, one for each circuit, biasing windings one for each relay, means whereby the operation by one line circuit of either receiving relay opens the other line circuit and reverses the bias of the other receiving relay, said means comprising in part unbalanced Wheatstone bridge circuits, each bridge controlled by one of said receiving relays and containing the biasing winding of the other receiving relay.

17. In a telegraph repeater, a Wheatstone bridge circuit, a receiving relay for controlling the balance of said bridge circuit, and means responsive to reversal of balance in said bridge circuit for preventing reflection signals in the repeater.

18. In a telegraph repeater, two receiving relays and two Wheatstone bridge circuits each controlled by one of said relays to render the remaining one of said relays ineffective, a line circuit including a winding of one of said relays, and a line circuit including a winding of the other of said relays, said line circuits and said repeater constituting a two-way channel for the transmission of telegraph impulses.

FULLERTON S. KINKEAD.